United States Patent
Liu et al.

(10) Patent No.: US 7,970,932 B2
(45) Date of Patent: Jun. 28, 2011

(54) VIEW-UPLOAD DECOUPLED PEER-TO-PEER VIDEO DISTRIBUTION SYSTEMS AND METHODS

(75) Inventors: Yong Liu, Secaucus, NJ (US); Keith W. Ross, New York, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 197 days.

(21) Appl. No.: 12/336,294

(22) Filed: Dec. 16, 2008

(65) Prior Publication Data

US 2010/0153575 A1    Jun. 17, 2010

(51) Int. Cl.
*G06F 15/173* (2006.01)
(52) U.S. Cl. ......... 709/239; 709/218; 709/242; 725/119
(58) Field of Classification Search ................. 709/231, 709/203, 207, 204, 216, 217, 218, 219, 238, 709/239, 242, 243; 715/719; 725/119
See application file for complete search history.

(56) References Cited

U.S. PATENT DOCUMENTS

| | | | | |
|---|---|---|---|---|
| 2008/0184119 A1* | 7/2008 | Eyal et al. | ...... | 715/719 |
| 2009/0083433 A1* | 3/2009 | Liu | ...... | 709/231 |
| 2009/0164576 A1* | 6/2009 | Noh et al. | ...... | 709/204 |
| 2010/0138511 A1* | 6/2010 | Guo et al. | ...... | 709/207 |
| 2010/0146040 A1* | 6/2010 | Ramakrishnan et al. | ..... | 709/203 |
| 2010/0146138 A1* | 6/2010 | Ng et al. | ...... | 709/231 |

* cited by examiner

*Primary Examiner* — Le Luu
(74) *Attorney, Agent, or Firm* — John C. Pokotylo; Straub & Pokotylo

(57) ABSTRACT

View-upload decoupled ("VUD") peer-to-peer (P2P) video distribution is provided, in which each peer is assigned to one or more channels to upload, with the assignments made independent of what the peer is viewing. For each assigned channel, the peer distributes (that is, uploads) the channel. This effectively creates semi-permanent distribution swarms for each channel, which are formed by peers responsible for uploading that channel. This can minimize problems associated with channel churn because peers may remain in their assigned distribution groups even if they switch channels. To minimize cross-channel overhead associated with VUD P2P video distribution, substream swarming, in which a peer in a distribution swarm only downloads a small portion of the video stream, called a substream, and uploads the substream to multiple viewers, may be provided. To minimize video streaming quality degradation that may occur during a reconfiguration transient period upon sudden and large increases in video download demands for some channel, VUD P2P video distribution may be integrated with tradition ISO P2P video distribution (which is self-adaptive to the sudden increases in channel popularity).

20 Claims, 8 Drawing Sheets

VIEW-UPLOAD DECOUPLED PEER-TO-PEER VIDEO DISTRIBUTION SYSTEMS AND METHODS

§1. BACKGROUND OF THE INVENTION

§1.1. Field of the Invention

The present invention concerns peer-to-peer ("P2P") communications. In particular, the present invention concerns peer upload of a stream or substream of video content to one or more other peers.

§1.2. Background Information

In recent years there have been several large-scale industrial deployments of P2P live video systems, including Coolstreaming, PPLive, PPStream, UUSee and Sopcast. Recent measurement studies have verified that hundreds of thousands of users can simultaneously participate in these systems. (See, e.g., X. Hei, C. Liang, J. Liang, Y. Liu, and K. W. Ross, "A Measurement Study of a Large-Scale P2P IPTV System," *IEEE Transactions on Multimedia* (December 2007) and, X Hei, Y. Liu, and K. Ross, "Inferring Network-Wide Quality In P2P Live Streaming Systems," *IEEE Journal on Selected Areas in Communications* (*the special issue on advances in P2P streaming*) (December 2007). These articles are incorporated herein by reference.) Almost all live P2P video systems offer multiple channels. For example, PPLive and its competitors each have over 100 channels. After joining a P2P video system, users can switch from one channel to another until they leave the system.

A common practice in P2P video today is to organize peers viewing the same channel into a so-called "swarm", with peers in the same swarm redistributing video chunks exclusively to each other. Such a design is referred to as an "isolated-channel" ("ISO") P2P video system. Thus, some current deployments distribute each video channel independently. Unfortunately, however, this approach leads to three critical problems—(1) long channel-switching delay, (2) high playback lag, and (3) poor small channel performance. Each of these problems is discussed below.

Measurement studies of PPLive and other live P2P streaming systems (See, e.g., X. Hei, C. Liang, J. Liang, Y. Liu, and K. W. Ross, "A Measurement Study of a Large-Scale P2P IPTV System," *IEEE Transactions on Multimedia* (December 2007), and X. Hlei, Y. Liu, and K. Ross, "Inferring Network-Wide Quality In P2P Live Streaming Systems," *IEEE Journal on Selected Areas in Communications* (*the special issue on advances in P2P streaming*) (December 2007). These articles are incorporated herein by reference.) indicate that current channel-switching delays are typically on the order of 10-60 seconds. This is clearly undesirable, as users are accustomed to delays of under 3 seconds in current cable and satellite television systems, and sub-second delays when switching pages on the Web. Furthermore, these measurement studies have shown that the playback lag (that is, the time from when a live video frame is emitted from the source until it is played at the peer) varies greatly from one peer to another, with delays ranging from 5 to 60 seconds. Unfortunately, the BitTorrent-like mesh-pull architectures which are currently used by most of the P2P video deployments are inherently delay and lag prone.

The present inventors expect these problems to be exacerbated in upcoming years. More specifically, the present inventors expect to see the emergence of user-generated live channels, for which any user can create their own temporary live video channel from a webcam or a hand-held wireless device. Similar to YouTube, such a live channel could be a comedy skit, professor's lecture, a sporting event, a wedding, an artistic performance, a political demonstration, etc. In the future, there may be thousands of such small channels at any one time, each emanating from a relatively low-speed connection (for example, wireless PDA) and each with 10-000 viewing peers. Thus, future user-generated systems might lead to thousands, if not millions, of live channels.

Measurement work (Recall, e.g., X. Heli, C. Liang, J. Liang, Y. Liu, and K. W. Ross, "A Measurement Study of a Large-Scale P2P IPTV System," *IEEE Transactions on Multimedia* (December 2007), and X. Hei, Y. Liu, and K. Ross, "Inferring Network-Wide Quality In P2P Live Streaming Systems," *IEEE Journal on Selected Areas in Communications* (*the special issue on advances in P2P streaming*) (December 2007). These articles are incorporated herein by reference.) has revealed, however, that current P2P live streaming systems generally provide inconsistent and poor performance to channels with a small number of peers. These performance problems primarily stem from two intrinsic characteristics of multi-channel P2P video systems—(1) "channel churn" and (2) "channel-resource imbalance". Each is introduced below.

To understand channel churn, note that churn occurs on two different time scales. More specifically, although peers generally enter and leave the video application on long time scales, peers generally change channels on short time scales. A recent study of a cable television system showed that users switch channels frequently. (See, e.g., M. Cha, P. Rodriguez, S. Moon, and J. Crowcroft, "On Next Generation Telco-Managed P2P TV Architectures," *Proceedings of International Workshop on Peer-to-Peer Systems* (2008). This article is incorporated herein by reference). Unfortunately, this channel churn brings enormous instability to P2P video systems. For example, when a peer switches from channel A to channel B, it will also stop uploading to its neighbor peers in swarm A. Consequently, those neighbor peers will have to find a new data feed to maintain steady video inflow. Further, in swarm B, the newly joining peer will have to find new neighbors with enough bandwidth and content to download from. (As used in this application, the term "download" includes receiving.) This can, and often does, lead to excessive channel switching delays.

To understand channel-resource imbalance, note that the aggregate upload rate for the peers participating in a channel may be less than the download rate demand for the channel (which is generally equal to the number of peers viewing the channel multiplied by the channel rate). In an isolated-channel design, many channels may have poor performance simply because they are resource-index poor (That is, the ratio of upload bandwidth to download demand is less than one. In other words, download demand is greater than upload bandwidth).

Moreover, channel switching and resource-index imbalance (where the ratio of upload bandwidth to download demand varies (above one and below one) for different channels) can conspire, leading to extremely poor performance for small channels.

In summary, although widely deployed, live P2P video distribution systems using an isolated-channel design have serious performance problems. Unfortunately, it is expected that such problems will only become more severe as video rates increase, and/or the number of user-generated channels grows (perhaps exponentially). In view of the foregoing problems with current live P2P video distribution systems, it would be useful to provide improved live P2P video distribution systems. It would be useful if such improved systems reduced channel-switching delays. It would be useful if such improved systems reduced playback lag. Finally, it would be useful if such improved systems improved small channel performance (that is, the performance of channels selected by a small number of peers).

§2. SUMMARY OF THE INVENTION

At least some embodiments consistent with the present invention provide view-upload decoupled ("VUD") P2P video distribution. In at least some such VUD video distribution embodiments, each peer is assigned to one or more channels to upload, with the assignments made independent of what the peer is viewing. For each assigned channel, the peer distributes (that is, uploads) the channel. This effectively creates semi-permanent distribution swarms for each channel, which are formed by peers responsible for uploading that channel.

Such embodiments minimize problems associated with channel churn because peers may remain in their assigned distribution groups even if they switch channels. Such embodiments also enable cross-channel multiplexing. That is, distribution swarms can be properly provisioned and adapted in response to evolving channel popularity, and can achieve a cross-channel multiplexing gain.

To minimize cross-channel overhead associated with VUD P2P video distribution, at least some embodiments consistent with the present invention include a "substream swarming" enhancement. More specifically, with substream swarming, a peer in a distribution swarm only downloads a small portion of the video stream, called a substream, and uploads the substream to multiple viewers. In this way, peers in distribution swarms act as bandwidth amplifiers. When combined with substream swarming, VUD P2P video distribution dramatically improves viewing and channel-switching performance without requiring significant upload bandwidth overhead.

To minimize video streaming quality degradation that may occur during a reconfiguration transient period upon sudden and large increases in video download demands for some channel, in at least some embodiments consistent with the present invention, VUD P2P video distribution may be integrated with traditional ISO P2P video distribution (which is self-adaptive to the sudden increases in channel popularity).

§3. BRIEF DESCRIPTION OF THE DRAWINGS

§4. DETAILED DESCRIPTION

The present invention may involve novel methods, apparatus, message formats, and/or data structures for improving P2P video distribution. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

An exemplary environment in which embodiments consistent with the present invention may be used is introduced in §4.1. Then, exemplary systems, methods, scheduler-s and peers for performing operations consistent with the present invention are described in §4.2. Next, exemplary apparatus for performing various operations and generating and/or storing various information in a manner consistent with the present invention are described in §4.3. Refinements, alternatives and extensions are described in §4.4. Finally, some conclusions about such exemplary embodiments are provided in §4.5.

Figure 1:
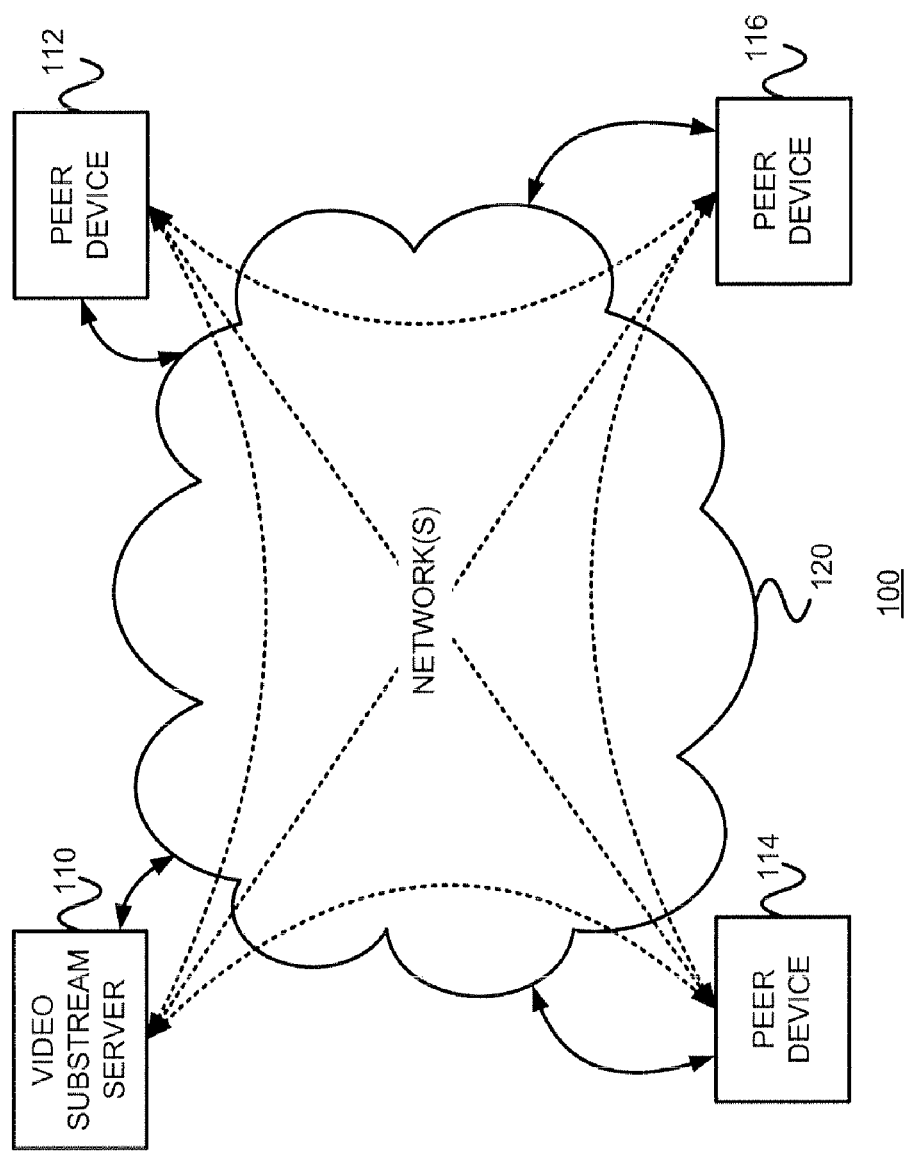
FIG. 1 illustrates an environment 100 in which embodiments consistent with the present invention may be used.

§4.1 Exemplary Environment in which Embodiments Consistent with the Present Invention may be used FIG. 1 illustrates an environment 100 in which embodiments consistent with the present invention may be used. Video substream (where each substream includes chunks) server 110 (which may also be thought of as a "video source" server) and peer devices 112, 114 and 116 can communicate with one another via one or more network(s) 120, such as the Internet for example. As indicated by the dashed lines, the video chunk server and each of the peers may establish a communications session with the others thereby establishing a full-mesh topology. Mesh-based systems have a lower delay bound than that which can be achieved by the optimal tree-based systems. The video chunk server 110 may (1) encode and stream video information (or simply stream previously encoded video information). The video chunk server 110 may include any device that may perform the foregoing function (s), such as a server computer for example. Thus, the video chunk server may be a computer, for example. The peer devices may (1) transmit (upload) streamed video data, (2) decode (and play) video information, or (3) both. (As used in this application, the term "upload" includes transmitting or distributing.) Peer devices may include any device that may perform one or both of the foregoing functions. Thus, peer devices may include server computers, desktop computers, laptop computers, smart phones, personal digital assistants ("PDAs"), video players, set-top boxes, etc. Scheduling the upload of video streams or substreams may be centralized (e.g., at the video chunk server), or distributed (e.g., at one or more of the peer devices).

§4.2 Exemplary Methods for Schedulers and/or Peers

Figure 2:
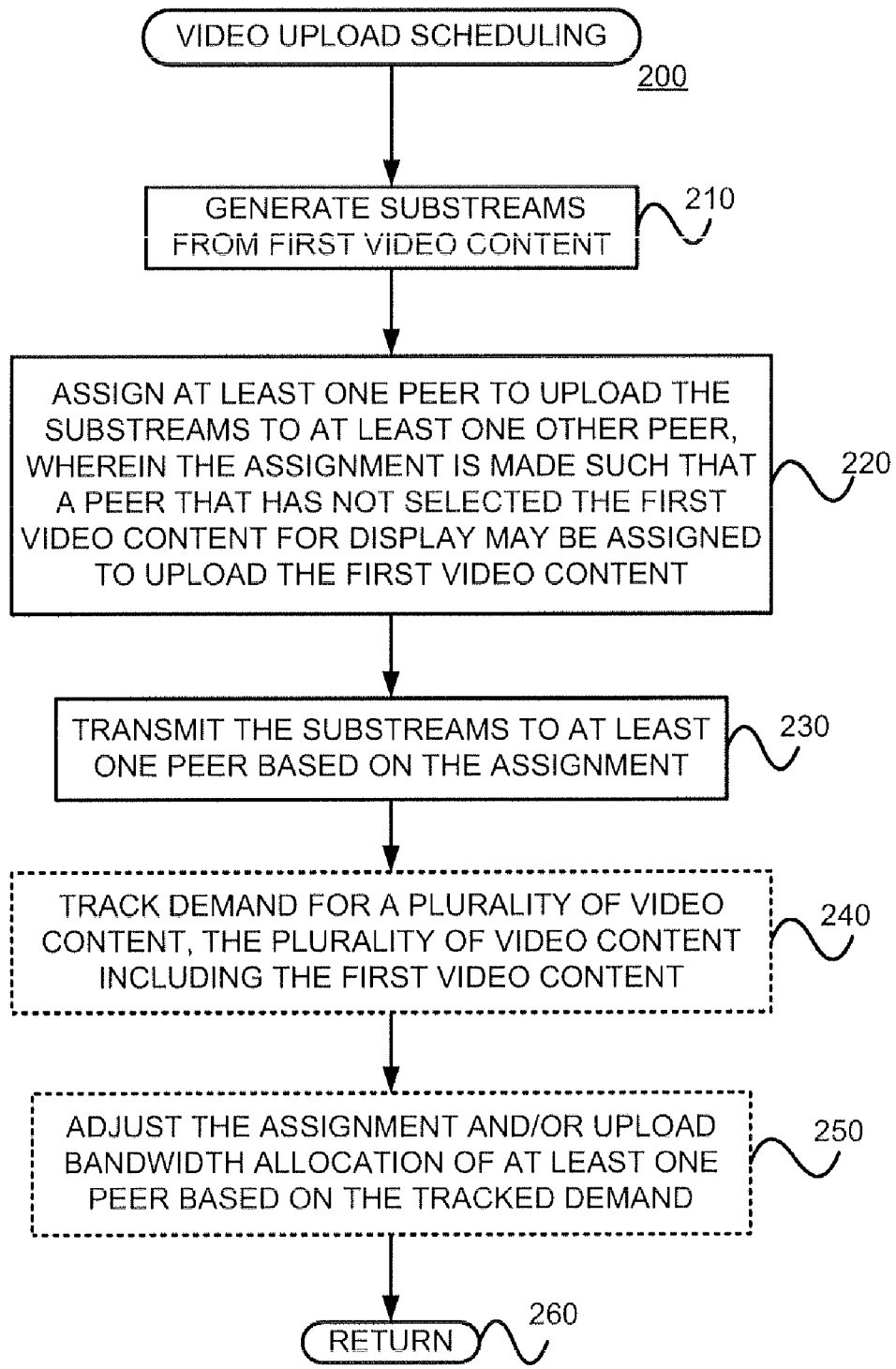
FIG. 2 is a flow diagram of an exemplary method for video upload scheduling, in a manner consistent with the present invention.

FIG. 2 is a flow diagram of an exemplary method 200 for video upload scheduling, in a manner consistent with the present invention. First video content is processed to generate (e.g., is divided into) substreams. (Block 210) (As used in this application, the term "substream" includes any part of a stream, such as a stream of encoded video, as would be understood by those skilled in the art. As used in the application, a "channel" is an example of a specific video content.) At least one peer may be assigned to upload the substreams to at least one other peer, wherein the assignment is made such that a peer that has not selected the first video content for display may nonetheless be assigned to upload the first video content. (Block 220) (As used in this application, "display" also includes rendering non-visual components, such as audio components for example, of a video file.) This is different from known techniques in which each peer only uploads video streams of video content it has requested (for display). The substreams are transmitted to at least one peer based on the assignment (Block 230) before the method 200 is left (Node 260).

In at least some embodiments consistent with the present invention, peer upload bandwidth may be allocated to upload the substreams, wherein the allocation is made such that a peer that has not selected the first video content for display may nonetheless allocate upload bandwidth to upload the substreams, and the substreams may then be transmitted to peers based on the assignment and allocation. In such embodiments, demand for a plurality of video content (including the first video content) is tracked (Block 240) and at least one of (A) the assignment of at least one peer and (B) the allocation of peer upload bandwidth is adjusted using the tracked demand (Block 250).

As can be appreciated from the foregoing, in at least some exemplary embodiments of the method 200, the assignment may be independent of whether or not a peer has selected the first video content for display.

Referring back to block 240, in at least some embodiments consistent with the present invention, the act of tracking demand may include tracking (A) any peers entering a P2P video system by opening P2P video system client software and selecting a channel offered by the P2P video system, (B) any peers switching a channel, and (C) any peers closing the P2P video system client software thereby leaving the P2P video system.

The method 200 of FIG. 2 might be performed by a scheduler for example. As discussed above, the scheduler may be centralized or distributed.

Figure 3:
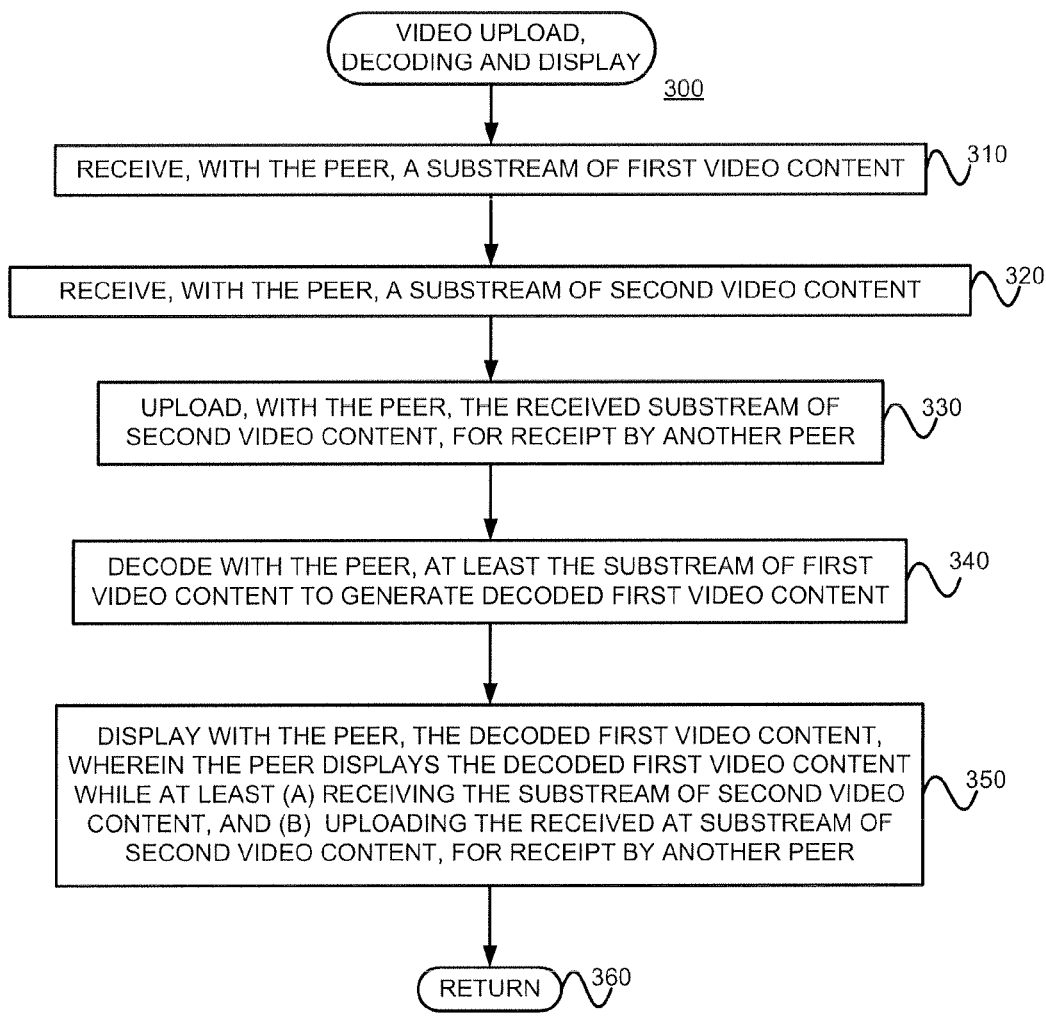
FIG. 3 is a flow diagram of an exemplary method for video upload, decoding and display, in a manner consistent with the present invention.

FIG. 3 is a flow diagram of an exemplary method 300 for video upload, decoding and display, in a manner consistent with the present invention. This method 300 might be performed by a peer itself. A substream of first video content, and a substream of second video content are received by a peer. (Blocks 310 and 320). The received substream of second video content is uploaded by the peer, for receipt by another peer. (Block 330) At least the substream of first video content is decoded by the peer to generate decoded first video content. (Block 340) The decoded first video content is displayed by the peer, wherein the peer displays the decoded first video content while (A) receiving the substream of second video content, and/or (B) uploading the received substream of second video content, for receipt by another peer. (Block 350) The method 300 is then left. (Node 360)

Referring back to block 330, in at least some embodiments consistent with the present invention, the act of uploading the received substream of second video content, for receipt by another peer, occurs without the peer decoding the substream of second video content.

Figure 4:
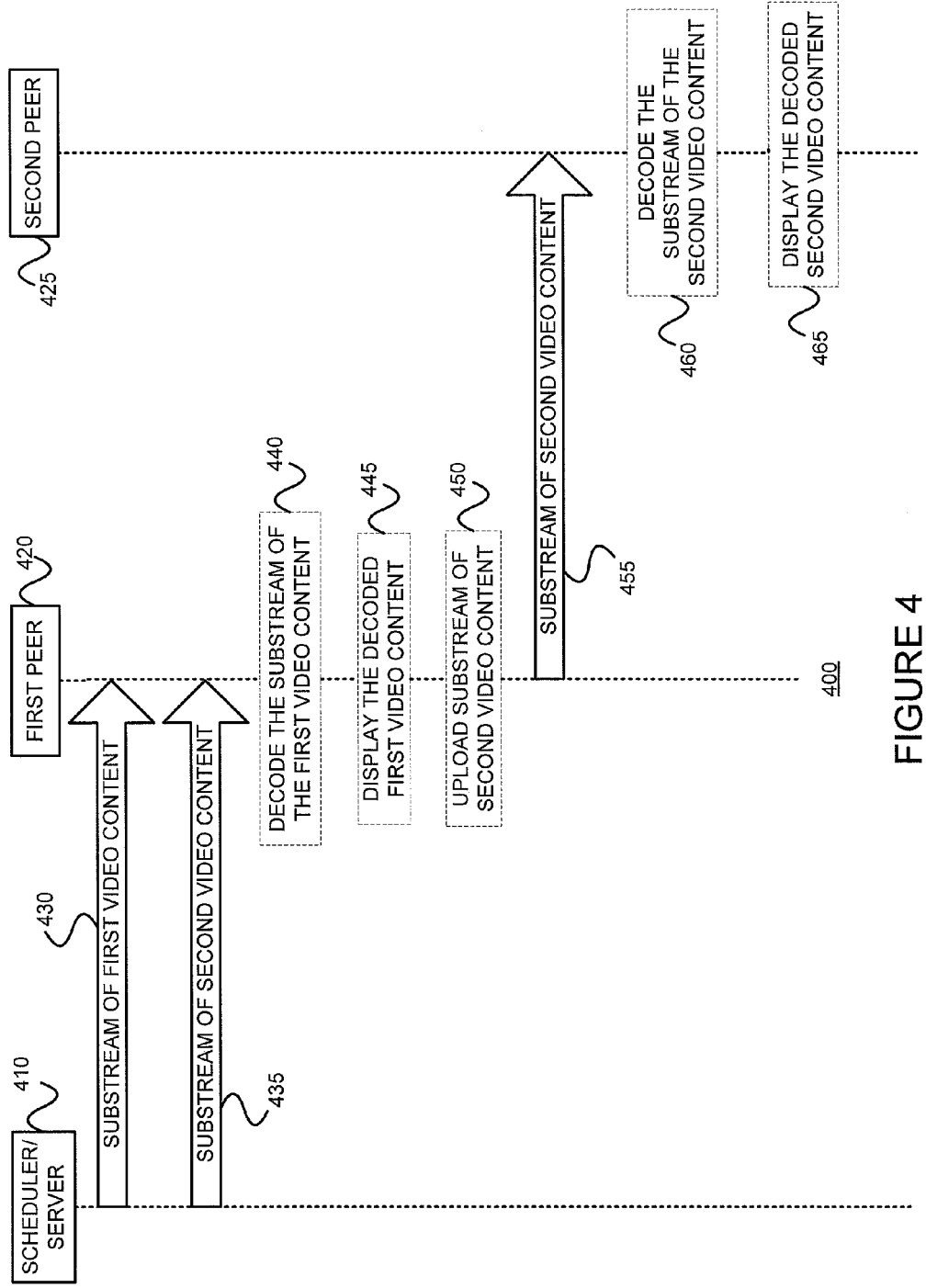
FIG. 4 is a messaging diagram illustrating communications and acts performed by components consistent with the present invention.

FIG. 4 is a messaging diagram illustrating communications and acts performed by components (a scheduler/server 410, a first peer 420 and a second peer 425) consistent with the present invention. The scheduler/server 410 (directly or indirectly) sends a substream of first video content and a substream of second video content to the first peer 420. (Communications 430 and 435) The first peer may decode and display the substream of first video content. (Blocks 440 and 445) Before, after or during this, the first peer 420 may also upload the substream of the second video content to the second peer 425. (Block 450 and Communication 455) Note that this may be done without the first peer 420 decoding and/or displaying the second video content. The second peer 425 may then decode and display the substream of second video content. (Blocks 460 and 465)

§4.2.1 View-Upload Decoupling Framework

In at least some embodiments consistent with the present invention, each video is divided into substreams. For example, to create n substreams for a video, the video source could assign every $n^{th}$ constant-size chunk to a substream. Let K denote the total number of substreams. For each substream, there is a subset of peers (referred to as a "substream distribution group") responsible for obtaining video chunks from the channel server, redistributing the substream chunks among the peers within the distribution group (peers can be in a distribution group regardless of whether or not the peer views the channel), and distributing the substream chunks to peers that want to view the corresponding channel. In such embodiments, if a video has K substreams, then a viewing peer needs to draw substreams from K different groups.

In at least some such embodiments, the groups may be thought of as being "semi-permanent." That is, the groups remain constant over medium time scales and do not change as peers change channels (referred to as "channel surfing"). That is, medium time scales correspond to the time a user stays in the system, viewing any channel of the system, versus the time it takes for a user to select a given channel to view. However, the groups can evolve to adapt to evolving channel popularity and peer churn (e.g., due to "flash crowd", described later).

In at least some such embodiments, if a peer is assigned to a distribution group for a substream, then it seeks to receive the complete substream. The peer may also redistribute the substream chunks to other peers in its distribution group, and to other peers outside the group that are currently viewing the corresponding channel.

In at least some such embodiments, a peer may belong to more than one distribution group. In such a case, the peer distributes more than one substream. If a peer is assigned to more than one substream, it allocates its upload bandwidth to its assigned substreams.

In at least some such embodiments, the aggregate upload capacity of a substream distribution group should reflect the demand for the substream. The greater the average channel demand, the larger the aggregate upload capacity for the corresponding substream groups.

In at least some such embodiments, the peers in a distribution group should be chosen in regions that match the geographical demand. For example, if the majority of the demand for a channel is in Korea and the USA, then most of peers for the corresponding substream groups should be in Korea and the USA (and not, say, in Europe and China).

§4.3 Exemplary Apparatus

Figure 5:
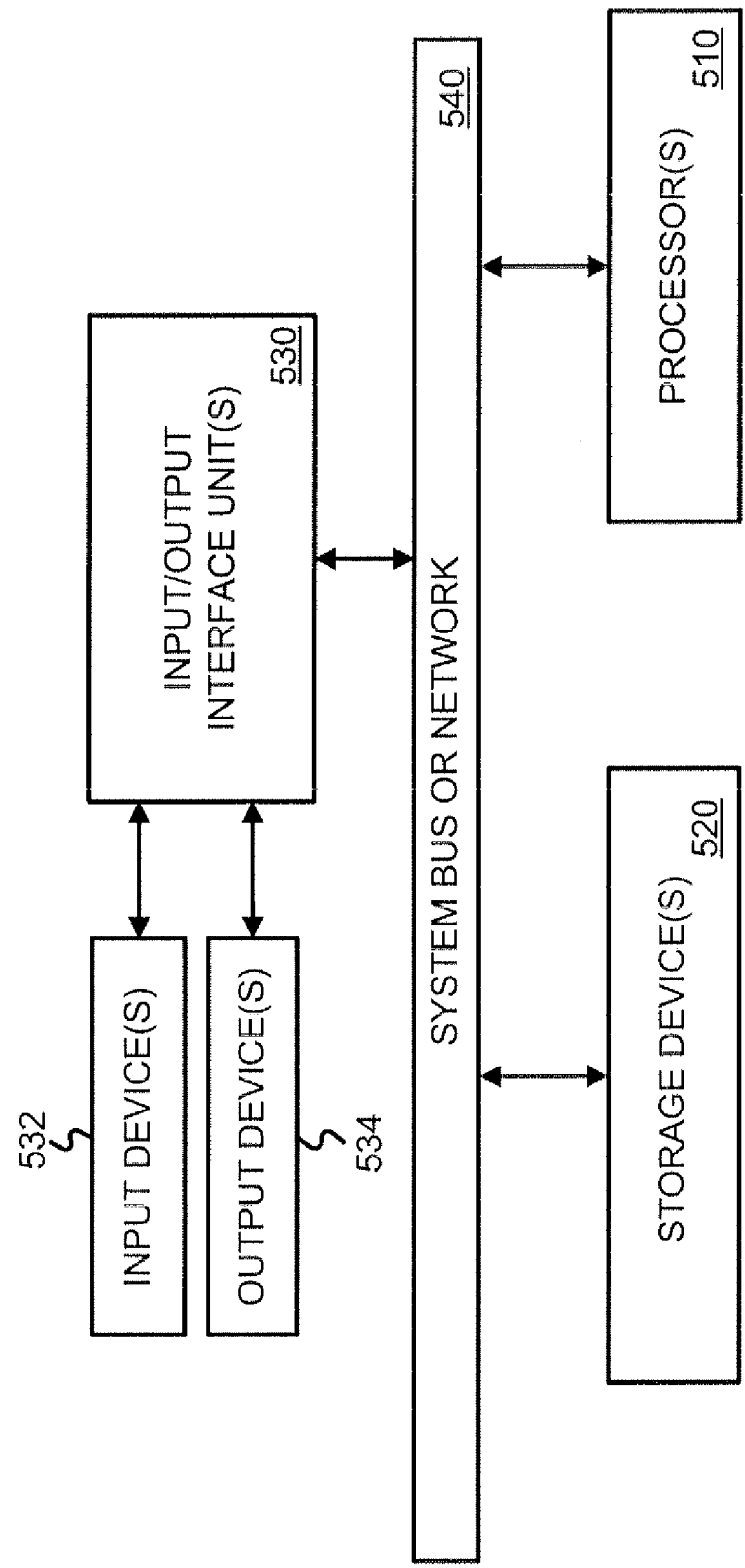
FIG. 5 is a block diagram of exemplary apparatus that may be used to perform operations in a manner consistent with the present invention, and/or to store information in a manner consistent with the present invention.

FIG. 5 is a block diagram of exemplary apparatus 500 that may be used to perform operations in a manner consistent with the present invention and/or to store information in a manner consistent with the present invention. The apparatus 500 includes one or more processors 510, one or more input/output interface units 530, one or more storage devices 520, and one or more system buses and/or networks 540 for facilitating the communication of information among the coupled elements. One or more input devices 532 and one or more output devices 534 may be coupled with the one or more input/output interfaces 530.

The one or more processors 510 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. For example, one or more software modules, when executed by a processor, may be used to perform one or more of the operations and/or methods of FIGS. 2-4. At least a portion of the machine executable instructions may be stored (temporarily or more permanently) on the one or more storage devices 520 and/or may be received from an external source via one or more input interface units 530.

In one embodiment, the machine 500 may be one or more conventional personal computers or servers. In this case, the processing units 510 may be one or more microprocessors. The bus 540 may include a system bus. The storage devices 520 may include system memory, such as read only memory (ROM) and/or random access memory (RAM). The storage devices 520 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 532, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 510 through an appropriate interface 530 coupled to the system bus 540. The output devices 534 may include a video monitor or other type of display device, which may also be connected to the system bus 540 via an appropriate interface. In addition to the video monitor, the personal computer may include other (peripheral) output devices (not shown), such as speakers and printers for example.

The operations of schedulers, servers, and/or peers, such as those described above, may be performed on one or more computers. Such computers may communicate with each other via one or more networks, such as the Internet for example. The various operations and information described above may be embodied by one or more machines 510. The schedulers, servers, and/or peers can be employed in nodes such as desktop computers, laptop computers, personal digital assistants, mobile telephones, other mobile devices, servers, etc. They can even be employed in nodes that might not have a video display screen, such as routers, modems, set top boxes, etc.

Alternatively, or in addition, at least some of the various operations and acts described above may be implemented in hardware (e.g., integrated circuits, application specific integrated circuits (ASICs), field programmable gate or logic arrays (FPGAs), etc.).

Figure 6:
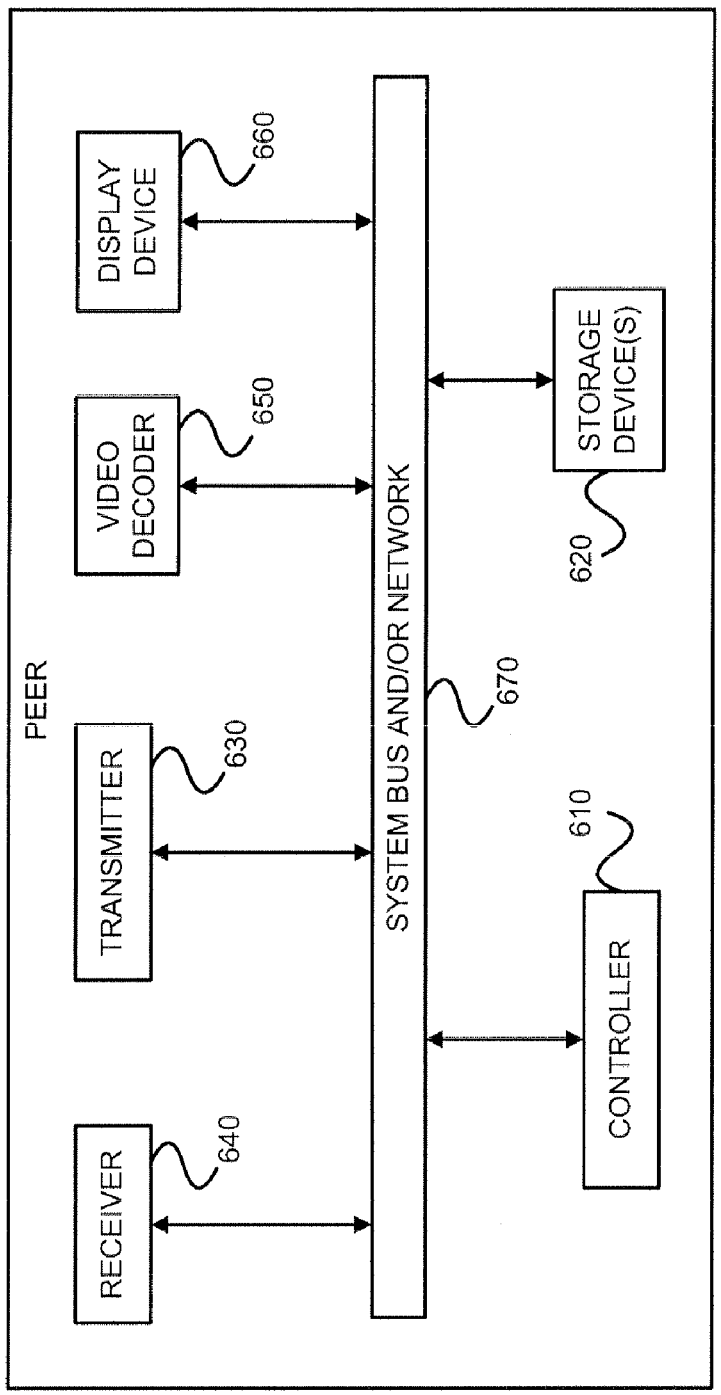
FIG. 6 is a block diagram of exemplary peer consistent with the present invention.

FIG. 6 is a block diagram of exemplary peer 600 consistent with the present invention. As shown, the peer 600 may include a controller 610, one or more storage devices 620, a transmitter 630, a receiver 640, a video decoder 650 a display device 660 and a system bus and/or network 670. The various components 610-660 may communicate with each other via the system bus and/or network 670.

The controller 610 may include a microprocessor, an ASIC, an FPGA, etc., and may control and coordinate operations of the other components 620-660 of the peer 600. The storage device(s) 620 may provide volatile and non-volatile storage of information, and/or program instructions.

The transmitter 630 may operate to upload one or more video substreams to one or more other peers.

The receiver 640 may operate to receive one or more video substreams (to be uploaded, to be decoded and viewed, or both). Video decoder 650 may decode video received substreams to be viewed on the peer 600. The decoded video may then be rendered on a display device 660. (Audio portions of a video stream may be decoded and rendered on a speaker (not shown).)

§4.4 Refinements, Alternatives and Extensions

Various refinements, alternatives and extensions are now described in §§4.4.1 through 4.4.4 below.

§4.4.1 VUD Distribution Swarm Design

Within a distribution group, the deployment of a specific distribution mechanism is not required. For example, tree distribution mechanisms (See, e.g., M. Castro, P. Druschel, A.-M. Kermarrec, A. Nandi, A. Rowstron, and A. Singh, "Splitstream: High-Bandwidth Multicast in Cooperative Environments," *Proceedings of ACM SOSP* (2003), and D. Kostic, A. Rodriguez, J. Albrecht, and A. Valhdat, "Bullet: High Bandwidth Data Dissemination Using an Overlay Mesh," *Proceedings of ACM Symposium on Operating Systems Principles* (2003). These articles are incorporated herein by reference), mesh-pull distribution mechanisms (See, e.g., X. Zhang, J. Liu, B. Li, and T.-S. P. Yum, "DONet/Cool-Streaming: A Data-driven Overlay Network for Peer-to-Peer Live Media Streaming," *Proceedings of IEEE INFOCOM* (March 2005), V. Pai, K. Kumar, K. Tamilmani, V. Samibamurthy, and A. E. Molhr, "Chainsaw: Eliminating Trees From Overlay Multicast," *The Fourth International Workshop on Peer-to-Peer Systems* (2005), and N. Magharel and R. Rejaie, "Prime: Peer-To-Peer Receiver-Driven Mesh-Based Streaming," *Proceedings of IEEE INFOCOM* (2007). These articles are incorporated herein by reference.) and mesh with push-pull distribution mechanisms (See, e.g., M. Zhang, L. Zhao, Y. Tanig, J.-G. Luo, and S. Yang, "A Peer-To-Peer Network for Streaming Multicast Through the Internet," *Proceedings of ACM Multimedia* (2005). This article is incorporated herein by reference.) may be used. However, since the substream distribution groups are relatively stable, it may be advantageous to employ tree-based distribution mechanisms since they generally provide better delay performance than mesh-based mechanisms.

Figure 7A:
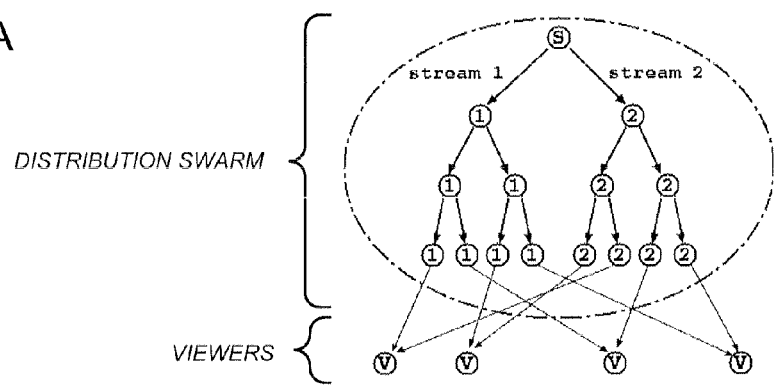
FIGS. 7A-7C illustrate various exemplary distribution swarm architectures consistent with the present invention.

As illustrated in FIG. 7A, one approach is to employ a multiple-tree structure for each distribution swarm, with one tree for each substream. To minimize the depth of the tree, (1) internal peers in a tree can allocate all their upload bandwidth to maximize their fan-out degrees to quickly push the substream to a large number of leaf peers, and (2) the upload bandwidth of leaf peers can be reserved to serve viewers of this channel. One drawback of a tree-based design is its vulnerability to application peer churn.

Figure 7B:
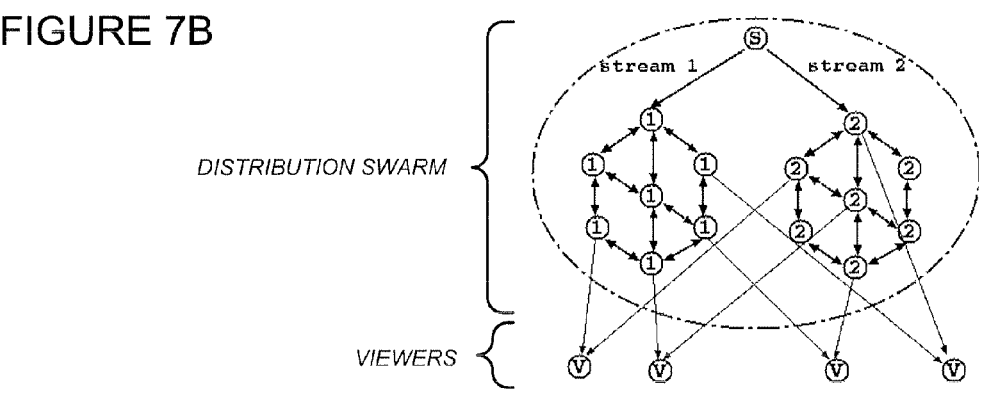

To increase the robustness of distribution swarms, one mesh can be created for each substream as shown in FIG. 7B. A peer in such a mesh might use a portion of its upload bandwidth to distribute the substream to other peers in the mesh. Its residual upload bandwidth might be used to upload the substream to the viewers (outside the mesh).

Figure 7C:
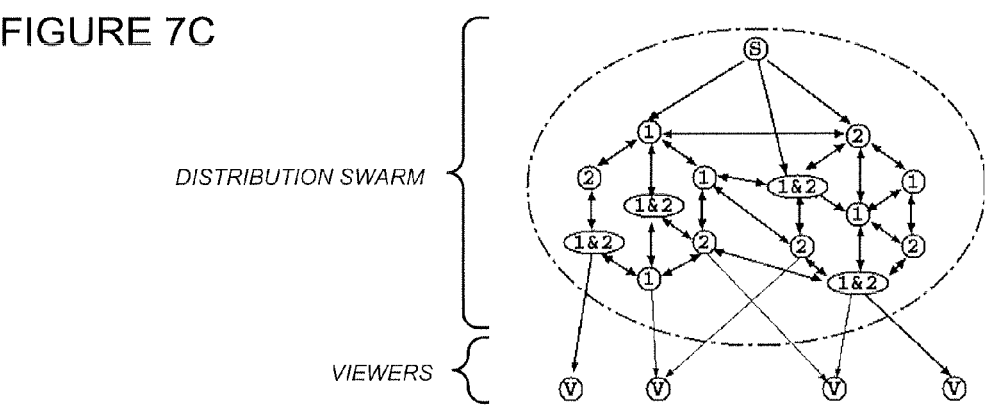

FIG. 7C illustrates a more flexible and adaptive solution in which all peers in one channel are connected using a unified mesh. However, unlike traditional mesh-based streaming (where every peer needs to collect the entire channel), a peer in the unified mesh only needs to distribute some substreams as shown. In a unified mesh, a peer maintains connections with peers uploading different substreams so that it can quickly adapt the substreams it uploads when needed.

§4.4.2 Reducing VUD Bandwidth Overhead Through Substreaming

One design concern for the VUD P2P video distribution embodiments consistent with the present invention is their bandwidth overhead. More specifically, the peers in a substream distribution group need to first download video of their substream (either directly from the server or from other distribution peers in the same group) before they can upload the substream to viewers served by the distribution group. Consequently, the aggregate download demand for each substream increases proportionally with the number of distribution peers in that substream. The "VUD overhead" of a channel is defined as the ratio between the total bandwidth (from the server and distribution peers) used to upload video to distribution peers and the upload bandwidth required to serve the viewers of this channel.

To understand the VUD overhead, consider one VUD channel with streaming rate r, m viewers, and n distribution peers. Distribution peer i has upload capacity of $u_i$. The VUD overhead of any channel with m viewers has an achievable lower bound of 1/ml. (See, e.g., Di Wu, Chao Liang, Yong Liu, and Keith Ross, "View-Upload Decoupling: A Redesign of Multi-Channel P2P Video Systems", *Technical Report, Polytechnic University* (April, 2008). This article is incorporated herein by reference.)

To achieve the lowest VUD overhead, each channel may be divided into many very fine substreams, each of which is distributed by a single distribution peer. However, for channels with a large number of viewers, it is likely impractical to have so many substreams. It is also unrealistic to have each distribution peer upload to all viewers. In practice, a channel is divided into a small number of substreams, each of which is distributed by a distribution group. The VUD overhead is determined by how substreams are divided and how distribution groups are formed. For a homogeneous P2P streaming system, in which all peers have the same upload capacity u, it has been shown that each channel should be partitioned into K equal-rate substreams. (See, e.g., Di Wu, Chao Liang, Yong Liu, and Keith Ross, "View-Upload Decoupling: A Redesign of Multi-Channel P2P Video Systems", *Technical Report, Polytechnic University* (April, 2008). This article is incorporated herein by reference.) The achieved VUD bandwidth overhead is:

$$\xi = \frac{(m-1)r}{m(uK-r)}$$

For heterogeneous peers with average upload bandwidth of $\bar{u}$, a channel can also be divided into K equal-rate substreams. Distribution peers can be assigned to distribution groups to keep the average upload bandwidth within each group balanced (i.e., $\bar{u}_k \approx \bar{u}$, $\forall k$, where $\bar{u}_k$ is the average upload bandwidth in group k). Following a similar procedure as in the homogeneous case, it can be shown that the achieved VUD is approximately:

$$\xi \approx \frac{(m-1)r}{m(\bar{u}K-r)}$$

Note that the VUD overhead will be implicitly bounded when peers are assigned to achieve high resource index for all channel.

Until this point, it was tacitly assumed that the substreams are simply obtained by partitioning each video with, for example, time-division multiplexing. In this case, a peer needs to receive all substreams in the channel to achieve acceptable viewing quality. Alternatively, layered video and Multiple-Description Coding ("MDC") may be used to create the substreams. As is well understood by those skilled in the art, layered coding encodes a video into several layers with nested dependency. Thus, layer n is only useful if layers 1 through n-1 are all available. More received layers reconstruct the video with higher quality. With layered coding (See, e.g., Mathias Wien, Heiko Schwarz, and Tobias Oelbaum, "Performance Analysis of SVC," *IEEE TCSVT*, vol. 17 (September 2007), and Mathias Wien, Renaud Cazoulat, Andreas Graffunder, Andreas Hutter, and Peter Amon, "Real-Time System for Adaptive Video Streaming Based On SVC," *IEEE TCSVT*, vol. 17 (September 2007). These articles are incorporated herein by reference), each layer can be delivered as a substream. To further reduce the overhead, each layer can also be time-divided into finer substreams.

Multiple Description Coding (MDC) also generates multiple substreams. (See, e.g., Yao Wang, Amy R. Reibman, and Shunan Lin, "Multiple Description Coding for Video Delivery," *Proceedings of the IEEE, Special Issue on Advances in Video Coding and Delivery*, vol. 93 (January 2005). This article is incorporated herein by reference.) Each substream is of equal importance, and there is no dependency. Thus, video quality is only a function of the total number of substreams received. This makes the design of a P2P live streaming system using MDC more straightforward. (See, e.g., M. Cistro, P. Druschel, A.-M. Kermarrec, A. Nandi, A. Rowstron, an (A. Singh, "Splitstream: High-Bandwidth Multicast in Cooperative Environments," *Proceedings of ACM SOSP* (2003), Venkata N. Padmanabhan, Helen J. Wang, Philip A. Chou, and Kunwadee Sripanidkulchai, "Distributing Streaming Media Content Using Cooperative Networking," *ACM NOSSDAV* (Miami, May 2003), Yu-Wei Sung, Michael Bishop, and Sanjay Rao, "Enabling Contribution Awareness In an Overlay Broadcasting System," *ACM SIGCOMM* (Pisa, September 2006), and Jan David Mol, Dick H. P. Epema, and Henk J. Sips, "The Orchard Algorithm: Building Multicast Trees for P2P Video Multicasting Without Free-Riding," *IEEE Trans. On Multimedia*, vol. 9 (December 2007). These articles are incorporated herein by reference.) Unfortunately, however, existing practical MDC algorithms incur significant overhead.

§4.4.3 Bandwidth Provisioning and Adaptation of VUD Swarms

The availability of upload bandwidth within each VUD swarm is an important factor determining the video streaming quality perceived by users. The resource index of a VUD swarm can be defined as the ratio between the total upload bandwidth in the swarm and the aggregate download demand. That is, the resource index may be expressed as:

$$\rho_j = \frac{u_s^j + \sum u_i^j}{m_j r_j},$$

where $r_j$ is the substream rate for swarm j, $m_j$ is the number of viewers in swarm j, and $u_s^j$ and $u_i^j$ are the server and distribution peer upload bandwidth in swarm j, respectively. The bandwidth provisioning of VUD streams includes two sub-problems—(1) how are peers assigned to substream distribution groups (referred to as "the peer assignment sub-problem"), and (2) how much upload bandwidth does any one peer allocate to each of its assigned substreams (referred to as the "bandwidth allocation sub-problem").

Ideally, it would be useful if such an assignment (1) balances the resource index across substreams, (2) adapts to variations in channel demand, and (3) is decentralized. However, it has been shown that even the static optimal VUD bandwidth provisioning problem is NP-Hard. (See, e.g., Di Wu, Chao Liang, Yong Liu, and Keith Ross, "View-Upload Decoupling: A Redesign of Multi-Channel P2P Video Systems", *Technical Report, Polytechnic University* (April, 2008). This article is incorporated herein by reference.) Consequently, a heuristic is used to assign peers to substream distribution groups. As the average demands for channels evolve and as peers churn (on a much larger time scale than channel churn), the assignments and allocations should adapt accordingly. A secondary goal is to assign and allocate so that when adapting to peer churn and long-term channel popularity evolution, such adaptation occurs by modifying the allocations more often than reassigning peers to groups.

In view of the foregoing assignment goals, the substream groups may be ordered in ascending order according to their resource indexes $\rho_k$. Let G be a parameter which is the maximum number of groups that a peer can initially be assigned to. Suppose a new peer i with upload capacity $u_i$ joins the system. This peer needs to be assigned to substream distribution groups. Then, its upload bandwidth needs to be assigned to substreams. Assigning peer i to the first G substreams in the ordered list (that is, to the G most resource-poor substreams) is first tried. To this end, a water-filling policy (whereby $u_i$ is distributed among the G groups in order to balance as much as possible the resource indexes of the G groups) may be used. When performing the water filling, the allocated bandwidth to group k $u_i^k$ should never be less than a lower bound $u_{min}^k$.

Since peers can leave the system and average demand for viewing channels can change, assignments and allocations might need to be adapted between peer arrivals. In at least some embodiments consistent with the present invention, if the resource index of a substream drops below a threshold $\rho_{min}$, the bandwidth allocations are adjusted without (if possible) modifying the peer assignments to distribution groups. Distribution groups having a resource index below a threshold $\rho_{min}$, are assigned to a set H. With such a fixed peer assignment, the optimal peer bandwidth allocation problem is simplified into a linear max-min programming problem. Using the Lagrangian relaxation method, this bandwidth allocation adjustment problem can be well-solved by distributed processes that can be implemented on individual peers.

After bandwidth allocation adjustment, if some distribution groups still have resource indexes below $\rho_{min}$, (i.e., still in set H), some of the peers from resource-index rich distribution groups will then be reassigned to such resource-index poor distribution groups. That is, in at least some embodiments consistent with the present invention, such a reassignment will shift nodes from resource-index rich groups to the groups that are below the threshold ($\rho_{min}$). More specifically, the distribution group k with the highest resource index may be selected first, and the distribution peers with the lowest utilization of upload bandwidth in that group may be continuously moved into a set P until the resource index of group k is just below the average resource index $\rho_{avg}$. Then, all the peers in set P may be sorted into a descending-ordered list based on their available upload bandwidth. After sorting, for each peer v in set P, from the first to the last, peer v is assigned to a distribution group j with the minimum resource index. Its updated resource index will be:

$$\rho'_j = \frac{u_s^j + \sum u_i^j + u_v}{m_j r_j},$$

where $r_j$ is the substream rate for group j, $m_j$ is the number of viewers for group j, $u_s^j$ and $u_i^j$ are existing server and peer upload bandwidth in group j, and $u_v$ is the upload bandwidth of peer v to join group j. If the updated resource index $\rho'_j \geq \rho_{min}$, distribution group j is removed from the set of resource-poor ($<\rho_{min}$) distribution groups H. If there are still some resource-index poor distribution groups in the set H after all the peers in P have been assigned, the distribution group with the second highest resource index is chosen and the process above is repeated. The process is executed until all the resource-index poor distribution groups have been removed from set H. Pseudo-code of an exemplary peer reassignment method is provided below:

```
Initialize H = {distribution groups with ρ ≤ ρ_min};
Initialize P = ∅;
while H ≠ ∅ do
    Select the distribution group k with the highest ρ;
    while ρ_k ≥ ρ_avg do
        Remove the peer with the lowest utilization of
        upload bandwidth from group k, and add the peer
        into P;
    end
    Sort the peers ∈ P in descending order according to
    their available upload bandwidth;
    for each peer υ ∈ P do
        From the first to the last, assign υ to a
        distribution group j in H that minimizes  ρ'_j = (u_s^j + Σu_i^j + u_υ)/(m_j r_j) ;
        If ρ'_j > ρ_min, remove group j from H;
    end
end
```

§4.4.4 Integrating VUD with ISO for Improved Adaptiveness

The exemplary view upload decoupled P2P video serving methods ("VUD") described above can significantly reduce peer channel switching delay and balance the resource availability across channels with different sizes. As discussed above, to handle dynamic variations in channel popularities, peer allocation and/or bandwidth allocation can be adapted to ensure that there is enough upload bandwidth to sustain video distributions in all VUD swarms. The most challenging case for VUD to adapt to is when a batch of peers simultaneously Switch to some channel that has suddenly become popular (referred to as "flash-crowd"). Specifically, it may take a long time to re-provision VUD swarms to accommodate flash-crowd.

On the other hand, the traditional isolated channel mesh P2P video serving method (ISO mesh) is self-adaptive to flash-crowd. Specifically, when more peers join a channel, such peers bring with them more upload bandwidth.

At least some embodiments consistent with the present invention integrate VUD with ISO designs to simultaneously achieve (1) low channel switching delays (under VUD), (2) balanced resources allocation cross channels with different sizes (under VUD), and (3) self-adaptiveness to significant and sudden channel popularity changes, such as flash-crowd (under ISO).

In conventional ISO streaming, a server can be used to reduce channel switching delays by directly uploading video substreams to peers when they initially join (e.g., the first x seconds) a channel. Consequently, peers will experience short channel switching delays. Meanwhile, a newly joined peer starts to connect to the ISO mesh. After a peer joins the channel long enough and establishes stable connections with other peers in the ISO mesh, it can transition to download video from the ISO mesh (and will no longer need downloads from the server). In addition, the server can reserve some bandwidth to feed peers in small channels (without any or many other peers), possibly throughout their whole duration in small channels.

However, the foregoing solution, which uses a server to serve video substreams to peers just joining a channel (or peers in a small channel), has potential scalability problems. In at least some embodiments consistent with the present invention, a VUD mesh is used to replace the server for feeding substreams to new peers (i.e., peers just joining a channel) and/or peers in small channels.

Figure 8:
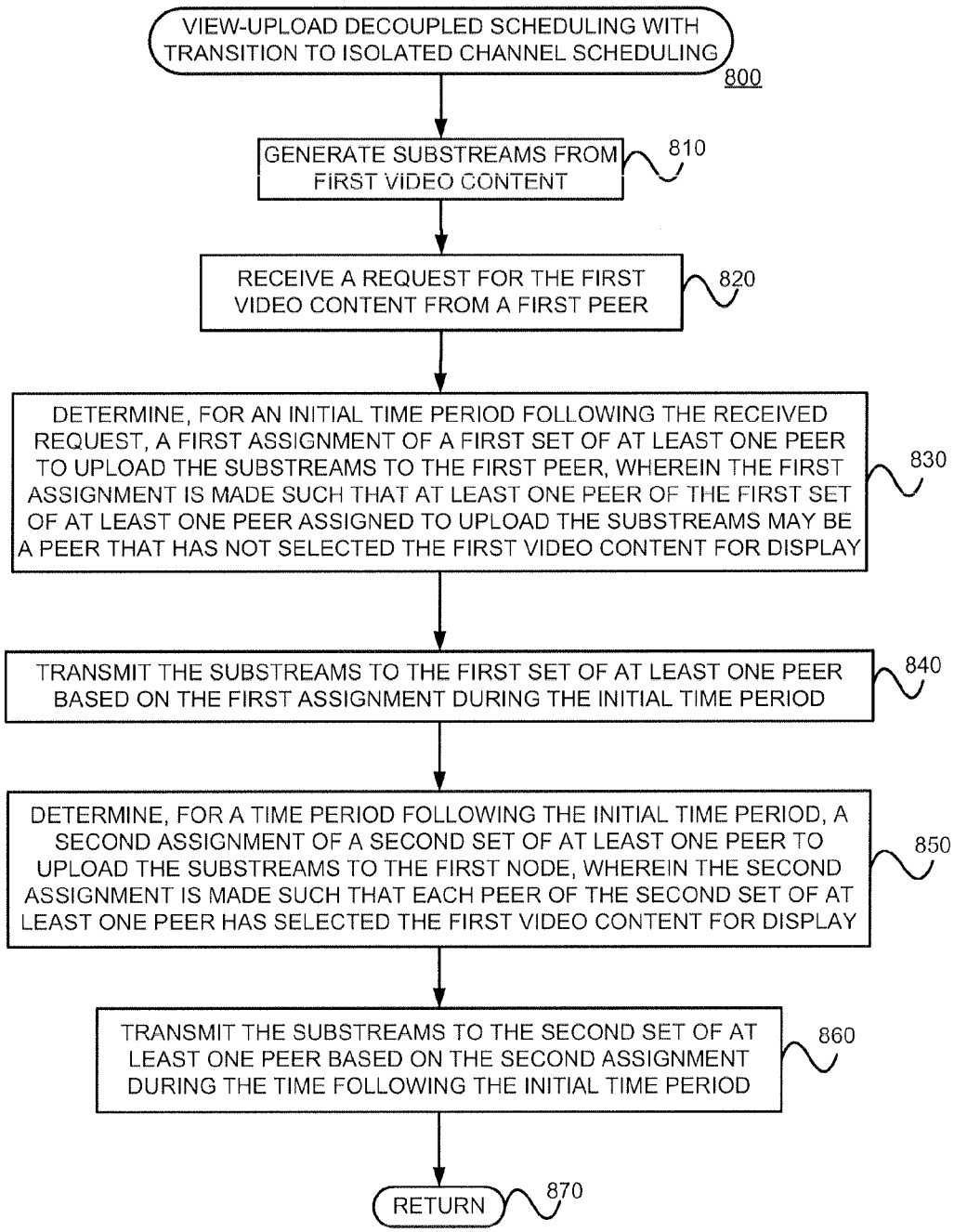
FIG. 8 is a flow diagram of an exemplary method for view-upload decoupled scheduling with a transition to isolated channel scheduling, in a manner consistent with the present invention.

FIG. 8 is a flow diagram of an exemplary method 800 for view-upload decoupled scheduling with a transition to isolated channel scheduling, in a manner consistent with the present invention. Substreams are generated from first video content. (Block 810) A request for the first video content is received from a first peer. (Block 820) For an initial time period following the received request, a first assignment of a first set of at least one peer to upload the substreams to the first peer is determined. (Block 830. This first assignment is made such that at least one peer of the first set of at least one peer assigned to upload the substreams may be a peer that has not selected the first video content for display. The substreams are then transmitted to the first set of at least one peer based on the first assignment during the initial time period. (Block 840) For a time period following the initial time period, a second assignment of a second set of at least one peer to upload the substreams to the first node is determined. (Block 850) The second assignment is made such that each peer of the second set of at least one peer has selected the first video content for display. Finally, the substreams are transmitted to the second set of at least one peer based on the second assignment during the time following the initial time period (Block 860) before the method 800 is left (Node 870).

More specifically, for some exemplary embodiments consistent with the present invention, for each channel, a VUD mesh (consisting of distribution peers for the channel), as well as a traditional ISO mesh (consisting of viewer peers of the channel), are set up. When a new peer joins the channel, it downloads video directly from the VUD mesh for the first x seconds (e.g., the first 60 seconds, or less). At the same time, the peer joins the ISO mesh for the channel. After x seconds, the new peer disconnects from the VUD mesh (and therefore only uploads and/or downloads video in the ISO mesh) for the channel.

The average workload on the VUD mesh is $\lambda x$, where $\lambda$ is the peer arrival rate for the channel. Consequently, the number of distribution peers needed for each VUD mesh is proportional to x. By manipulating x, the workload can be controlled. The overhead of VUD meshes can be similarly controlled. Due to the largely reduced workload on VUD meshes, the VUD can be greatly over-provisioned, thereby improving its adaptiveness in the transient period. Long-term adaptiveness is achieved automatically within the ISO meshes for each channel.

In at least some embodiments consistent with the present invention, peers selecting small channels either (A) always download from VUD meshes, or (B) use large x (e.g., so that the transition occurs after about 10 minutes or so). Due to the small peer population, the VUD mesh can be over-provisioned to improve adaptiveness.

Although the foregoing embodiments do not directly address the potential problem of peer departure, such potential problems are unlikely. More specifically, after a peer stays in an ISO) mesh long enough, its departure may cause some degradation to its neighbors. Fortunately, however, transient peers hopping from one channel to another channel properly won't upload too much in ISO mesh. Consequently, their departure should not cause much disturbance to ISO.

§4.5 Conclusions

Embodiments consistent with the present invention provide a new P2P video distribution approach in which peers may distribute video independently of what they are viewing within distribution groups. These distribution groups may be fixed over moderate time scales. The View-Upload Decoupling ("VUD") methods described above reduce channel switching delay and playback lag, and improve small channel performance.

Although VUD introduces some distribution overhead, partitioning each video into substreams and distributing each substream within its own distribution group may be used to greatly reduce overhead.

Finally, in at least some embodiments consistent with the present invention, VUD is integrated with traditional independent distribution to make the video distribution self-adaptive to channel popularity variations (such as "flash crowd").

What is claimed is:

1. A method comprising:
   a) generating, using a video substream server, substreams from video content;
   b) assigning, using a controller, at least one peer to upload the substreams to at least one other peer, wherein the assignment is made such that a peer that has not selected the video content for display is, nonetheless, eligible to be assigned to upload the video content; and
   c) transmitting, using a transmitter, the substreams to at least one peer based on the assignment.

2. The method of claim 1, wherein the assignment is independent of whether or not a peer has selected the video content for display.

3. The method of claim 1 further comprising:
   d) allocating, using the controller, peer upload bandwidth to upload the substreams, wherein the allocation is made such that a peer that has not selected the video content for display is, nonetheless, eligible to allocate upload bandwidth to upload the substreams; and
   e) transmitting, using the transmitter, the substreams to peers based on the assignment and allocation.

4. The method of claim 3 further comprising:
f) tracking demand for a plurality of video content, the plurality of video content including the video content; and
g) adjusting, using the controller, at least one of (A) the assignment of at least one peer and (B) the allocation of peer upload bandwidth using the tracked demand.

5. The method of claim 4 wherein the act of tracking demand includes tracking (A) any peers entering a peer-to-peer video system by opening peer-to-peer video system client software and selecting a channel offered by the peer-to-peer video system, (B) any peers switching a channel, and (C) any peers closing the peer-to-peer video system client software thereby leaving the peer-to-peer video system.

6. The method of claim 1 further comprising:
d) tracking demand for a plurality of video content, the plurality of video content including the video content; and
e) adjusting, using the controller, the assignment of at least one peer based on the tracked demand.

7. The method of claim 6 wherein the act of tracking demand includes tracking (A) any peers entering a peer-to-peer video system by opening peer-to-peer video system client software and selecting a channel offered by the peer-to-peer video system, (B) any peers switching a channel, and (C) any peers closing the peer-to-peer video system client software thereby leaving the peer-to-peer video system.

8. A method comprising:
a) generating, using a video substream server, substreams from first video content;
b) receiving, using a receiver, a request for the first video content from a first peer;
c) determining, using a controller, for an initial time period following the received request, a first assignment of a first set of at least one peer to upload the substreams to the first peer, wherein the first assignment is made such that at least one peer of the first set of at least one peer assigned to upload the substreams is, nonetheless, eligible to be a peer that has not selected the first video content for display;
d) transmitting, using a transmitter, the substreams to the first set of at least one peer based on the first assignment during the initial time period;
e) determining, using the controller, for a time period following the initial time period, a second assignment of a second set of at least one peer to upload the substreams to the first node, wherein the second assignment is made such that each peer of the second set of at least one peer has selected the first video content for display; and
f) transmitting, using the transmitter, the substreams to the second set of at least one peer based on the second assignment during the time following the initial time period.

9. A method for use by a peer, the method comprising:
a) receiving, with a receiver of the peer, a substream of first video content;
b) receiving, with the receiver of the peer, a substream of second video content;
c) uploading, with a transmitter of the peer, the received substream of second video content, for receipt by another peer;
d) decoding, with a video decoder of the peer, at least the substream of first video content to generate decoded first video content; and
e) displaying, with a display of the peer device, the decoded first video content,
wherein the peer displays the decoded first video content while at least (A) receiving the substream of second video content, and (B) uploading the received at substream of second video content, for receipt by another peer.

10. The method of claim 9 wherein the act of uploading the received substream of second video content, for receipt by another peer, occurs without the peer decoding the substream of second video content.

11. Apparatus comprising:
a) a video substream server configured to generate substreams from video content;
b) a controller configured to assign at least one peer to upload the substreams to at least one other peer, wherein the assignment is made such that a peer that has not selected the video content for display is, nonetheless, eligible to be assigned to upload the video content; and
c) a transmitter configured to transmit the substreams to at least one peer based on the assignment.

12. The apparatus of claim 11, wherein the assignment is independent of whether or not a peer has selected the video content for display.

13. The apparatus of claim 11, wherein the controller is further configured to allocate peer upload bandwidth to upload the substreams, wherein the allocation is made such that a peer that has not selected the video content for display is, nonetheless, eligible to allocate upload bandwidth to upload the substreams, and
wherein the transmitter is further configured to transmit the substreams to peers based on the assignment and allocation.

14. The apparatus of claim 13, wherein the controller is further configured to track demand for a plurality of video content, the plurality of video content including the video content, and
to adjust at least one of (A) the assignment of at least one peer and (B) the allocation of peer upload bandwidth using the tracked demand.

15. The apparatus of claim 14, wherein the controller tracks demand by tracking (A) any peers entering a peer-to-peer video system by opening peer-to-peer video system client software and selecting a channel offered by the peer-to-peer video system, (B) any peers switching a channel, and (C) any peers closing the peer-to-peer video system client software thereby leaving the peer-to-peer video system.

16. The apparatus of claim 11, wherein the controller is further configured to track demand for a plurality of video content, the plurality of video content including the video content, and
adjust the assignment of at least one peer based on the tracked demand.

17. The apparatus of claim 16, wherein the controller tracks demand by tracking (A) any peers entering a peer-to-peer video system by opening peer-to-peer video system client software and selecting a channel offered by the peer-to-peer video system, (B) any peers switching a channel, and (C) any peers closing the peer-to-peer video system client software thereby leaving the peer-to-peer video system.

18. Apparatus comprising:
a) a video substream server configured to generate substreams from first video content;
b) a receiver configured to receive a request for the first video content from a first peer;
c) a controller configured to determine, for an initial time period following the received request, a first assignment of a first set of at least one peer to upload the substreams to the first peer, wherein the first assignment is made such that at least one peer of the first set of at least one peer assigned to upload the substreams is, nonetheless, eligible to be a peer that has not selected the first video content for display; and d) a transmitter configured to transmit the substreams to the first set of at least one peer based on the first assignment during the initial time period, wherein the controller is further configured to determine, for a time period following the initial time period, a second assignment of a second set of at least one peer to upload the substreams to the first node, wherein the second assignment is made such that each peer of the second set of at least one peer has selected the first video content for display, and wherein the transmitter is further configured to transmit the substreams to the second set of at least one peer based on the second assignment during the time following the initial time period.

19. Apparatus comprising:

a) a receiver configured to receive a substream of first video content and a substream of second video content;

b) a transmitter configured to upload the received substream of second video content, for receipt by another peer;

c) a video decoder configured to decode at least the substream of first video content to generate decoded first video content; and d) a display device configured to display the decoded first video content, wherein the display device displays the decoded first video content while at least (A) receiving the substream of second video content, and (B) uploading the received at substream of second video content, for receipt by another peer.

20. The apparatus of claim 19, wherein the transmitter uploading the received substream of second video content, for receipt by another peer, uploads the received substream of second video content without the peer decoding the substream of second video content.

* * * * *